(12) United States Patent
Naito et al.

(10) Patent No.: US 6,425,431 B1
(45) Date of Patent: Jul. 30, 2002

(54) WELDING METHOD USING HEATING PLATE AND WELDING APPARATUS USING THE SAME

(75) Inventors: Toshitaka Naito; Masahiko Koizumi; Tomoki Kumayama; Hiroyuki Kageyama; Fujihiko Sugiyama; Seiichi Gyotoku, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/477,552

(22) Filed: Jan. 4, 2000

(30) Foreign Application Priority Data

Jan. 6, 1999 (JP) ............................................ 11-000991

(51) Int. Cl.[7] .......................... B29C 65/02; B29C 65/20
(52) U.S. Cl. ........................ 156/539; 156/538; 156/580; 156/304.2; 156/304.6; 156/583.1; 100/92
(58) Field of Search .............................. 156/580, 304.1, 156/304.2, 304.5, 304.6, 499, 538, 539; 100/92

(56) References Cited

U.S. PATENT DOCUMENTS

| 4,960,478 A | * | 10/1990 | Newkirk et al. ............ 156/228 |
| 4,971,639 A | | 11/1990 | Quinn et al. ................... 156/64 |
| 5,151,149 A | * | 9/1992 | Swartz ...................... 156/379.8 |
| 5,240,536 A | | 8/1993 | Kurobe ........................ 156/228 |

FOREIGN PATENT DOCUMENTS

| GB | 1249168 | 10/1971 | ........... B29C/27/02 |
| GB | 2214862 A | 9/1989 | ........... B29C/65/02 |
| GB | 2251822 A | 7/1992 | ........... B29C/65/18 |
| JP | 10-30918 | 8/1998 | |

* cited by examiner

Primary Examiner—Richard Crispino
Assistant Examiner—Sue A. Purvis
(74) Attorney, Agent, or Firm—Sughrue Mion, PLLC

(57) ABSTRACT

An apparatus of welding a plurality of parts comprises a plural pairs of jigs, a plurality of heating plates, a working region, a heating-plate stocker, a heating-plate standby region, and a heating-plate slider. The pairs of jigs supports a plurality of parts, and each pair of the jigs has a shape different from another pair of jigs. The heating plates respectively correspond to each pair of the jigs. The working region is for welding the parts with the jigs and the heating plates. The heating-plate stocker stocks and heats the heating plates. The heating-plate standby region is for standing by for moving the heating plates with heating between the working region and the heating-plate stocker. A heating-plate slider is for sliding the heating plates between the heating-plate standby region and the heating-plate stocker.

11 Claims, 7 Drawing Sheets

WELDING METHOD USING HEATING PLATE AND WELDING APPARATUS USING THE SAME

BACKGROUND OF THE INVENTION

The present invention relates to a novel welding method using a heating plate and a welding apparatus using a heating plate, and more particularly to a technique with which two synthetic resin parts supported by upper and lower jigs are previously heated by a heating plate and pressing and welding the two synthetic resin parts and which enables tact time to be shortened.

As a means for joining two synthetic resin parts to each other, a welding method using a heating plate is known. The foregoing method has steps for preparing one pair of jigs, that is, an upper jig and a lower jig; making two synthetic resin parts, which must be joined to each other, supported by the corresponding jigs; heating the synthetic resin parts by a heating plate; making the two jigs approach each other in order to press joining portions of the two supported synthetic resin parts against each other so that the pressed portions are welded to each other.

The schematic structure of the foregoing welding method using a heating plate is shown in FIGS. 1 to 6.

An upper jig 2 and a lower jig 3 are disposed in a working region 1 so as to be joined to corresponding elevating means (not shown). Moreover, a heating plate 5 is disposed in a heating-plate standby region 4. The heating plate 5 is previously heated in the heating-plate standby region 4. Then, synthetic resin parts 6 and 7 are supported by the jigs 2 and 3, respectively (see FIG. 1).

Then, the heating plate 5 is moved to the working region 1 so as to be disposed between the upper jig 2 and the lower jig 3 separated from each other in the vertical direction (see FIG. 2).

Then, the upper jig 2 and the lower jig 3 are moved to approach each other, and then the synthetic resin parts 6 and 7 supported by the jigs 2 and 3 are brought into contact with the heating plate 5 (see FIG. 3). Thus, the synthetic resin parts 6 and 7 are heated.

After the synthetic resin parts 6 and 7 have sufficiently be heated, the jigs 2 and 3 are separated from each other in the vertical direction. Moreover, the heating plate 5 is returned to the heating-plate standby region 4 (see FIG. 4).

Then, the upper and lower jigs 2 and 3 are moved to approach each other, and the joining portions of the synthetic resin parts 6 and 7 are pressed with melted and joined against each other (see FIG. 5).

Finally, the upper and lower jigs 2 and 3 are separated from each other in the vertical direction to extract the joined synthetic resin parts 6 and 7 (see FIG. 6) left on the lower jig 3. Thus, the welding operation is completed.

The welding operation using the heating plate is performed as described above. In the conventional method, a working region a and a heating-plate standby region b are arranged as shown in FIG. 14. That is, a very simple arrangement has been employed in which the heating-plate standby region b is disposed at a deep position as compared with the working region a.

In an actual manufacturing site, plural types of products, not only one type of products, are manufactured. Therefore, one welding apparatus using a heating plate is operated to perform welding of parts of a plurality of products. If parts of a next product are welded after parts of one product have been welded, the jigs and the heating plate must be changed to those for the parts of the next product.

Hitherto, the following process must be performed such that the jigs 2 and 3 and the heating plate 5 for use to weld the parts of the previous product are removed from the working region a and the heating-plate standby region b by an operator c so as to be moved to a storage portion by using a carrier car or the like. Then, jigs 2 and 3 and the heating plate 5 for use to weld the parts of a next product are carried by similarly using the carrier car so as to be disposed in the working region a and the heating-plate standby region b. The foregoing operation is a complicated operation. Moreover, the heating plate 5 must be joined to a predetermined position of the heating-plate standby region b before the heating operation is started. Since a long time is required to heat the heating plate 5, a wasteful operating time cannot be omitted.

SUMMARY OF THE INVENTION

In view of the foregoing, an object of the present invention is to improve the working efficiency and shorten tact time.

To overcome the foregoing problems, according to the present invention, there is provided a method of welding a plurality of parts comprising the steps of: setting a first and second jigs in a working region; putting the first and second jigs in a standby position; moving the heating plate corresponding to the first and second jigs and previously heated from a heating-plate stocker adjacent to a heating-plate standby region to the heating-plate standby region during setting the first and second jigs in the working region, and the parts supported on the first and second jigs in a working standby condition; heating the parts supported on the first and second jigs with the heating plate after moving the heating plate to the working region; welding the heated parts after removing the heating plate from the working; and conveying the heating plate from the heating-plate standby region and conveying the first and second jigs from the working region.

The welding method using a heating plate according to the present invention has the step for moving the heating plate corresponding to the jig and previously heated from a heating-plate-stocker disposed adjacent to a heating-plate standby region to the heating-plate standby region during a period of time for introducing the upper and lower jigs into the working region and putting the jigs on operation standby.

Therefore, a welding step using the heating plate can immediately be started after the jigs have been put on operation standby. Therefore, the working efficiency can be improved and the tact time can be shortened.

To overcome the foregoing problems, there is provided an apparatus for welding a plurality of parts comprises a plural pairs of jigs, a plurality of heating plates, a working region, a heating-plate stocker, a heating-plate standby region, and a heating-plate slider. The pairs of jigs supports a plurality of parts, and each pair of the jigs has a shape different from another pair of the jigs. The heating plates respectively correspond to each pair of the jigs. The working region is for welding the parts with the jigs and the heating plates. The heating-plate stocker stocks and heats the heating plates. The heating-plate standby region is for standing by for moving the heating plates with heating between the working region and the heating-plate stocker. a heating-plate slider is for sliding the heating plates between the heating-plate standby region and the heating-plate stocker.

Therefore, the welding apparatus using a heating plate according to the present invention has the structure that the heating-plate stocker is disposed adjacent to the heating-plate standby region and the heating-plate is moved from the heating-plate stocker to the heating-plate standby region by the sliding means. Therefore, change of the heating plates can be quickly performed. Hence it follows that the working efficiency can be improved and the tact time can be shortened.

DETAILED DESCRIPTION OF THE PREFERRED EMBODIMENT

An embodiment of a welding method using a heating plate and a welding apparatus using the same according to the present invention will now be described with reference to the drawings.

Figure 1:
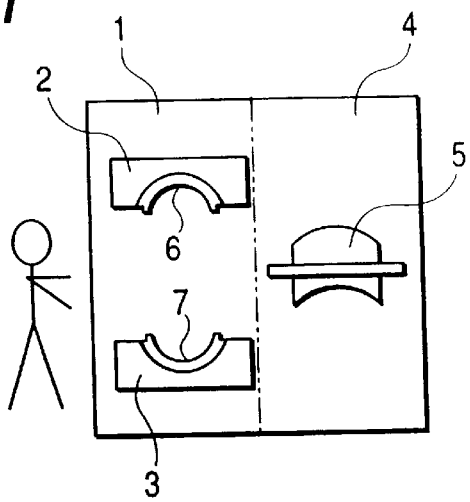
FIG. 1 is a schematic side view, together with FIGS. 2 to 6, showing the procedure of a welding operation using a heating plate and a state in which upper and lower jigs supporting synthetic resin parts are separated from each other in the vertical direction and a heating plate has been put on standby in a heating-plate standby region.
Figure 2:
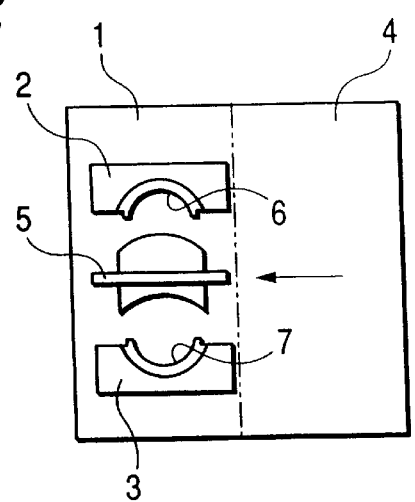
FIG. 2 shows a state in which the heating plate has been moved to a position between the upper and lower jigs.
Figure 3:
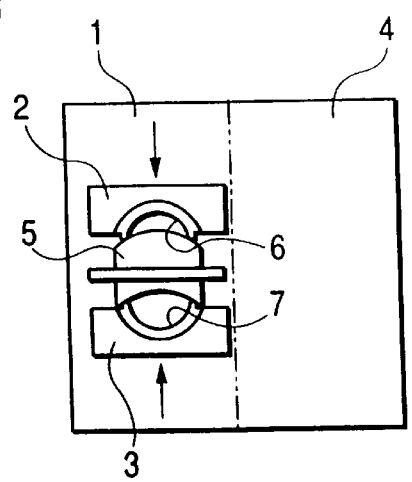
FIG. 3 is a diagram showing a state in which the upper and lower jigs have been moved to approach each other so that the heating plate has been brought into contact with the synthetic resin parts.
Figure 4:
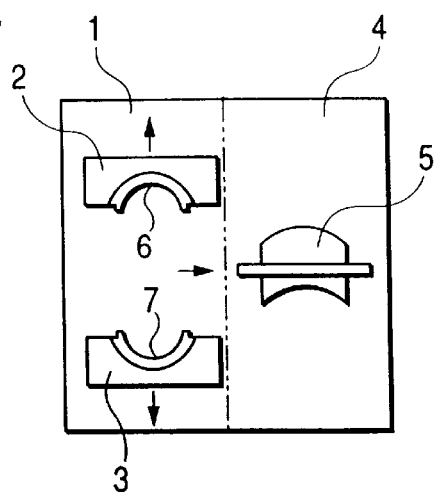
FIG. 4 is a diagram showing a state in which the upper and lower jigs have been separated from each other in the vertical direction and the heating plate has been moved to the heating-plate standby region.
Figure 5:
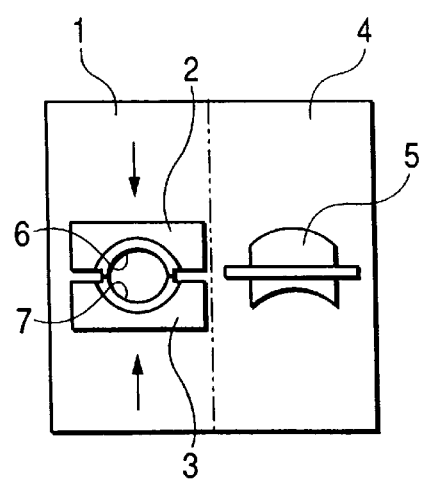
FIG. 5 is a diagram showing a state in which the upper and lower jigs have been moved to approach each other so that joining portions of the two synthetic resin parts have been pressed against each other.
Figure 6:
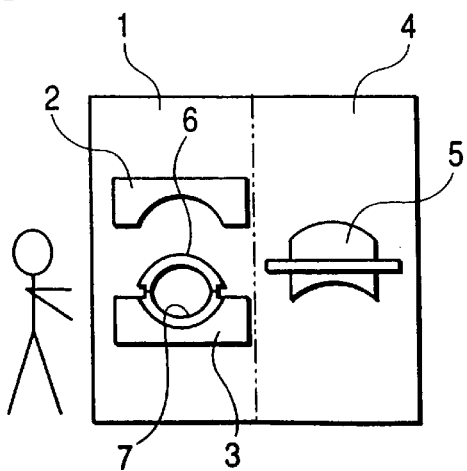
FIG. 6 is a diagram showing a state in which the two synthetic resin parts have been welded to each other and the upper and lower jigs have been separated from each other in the vertical direction.
Figure 7:
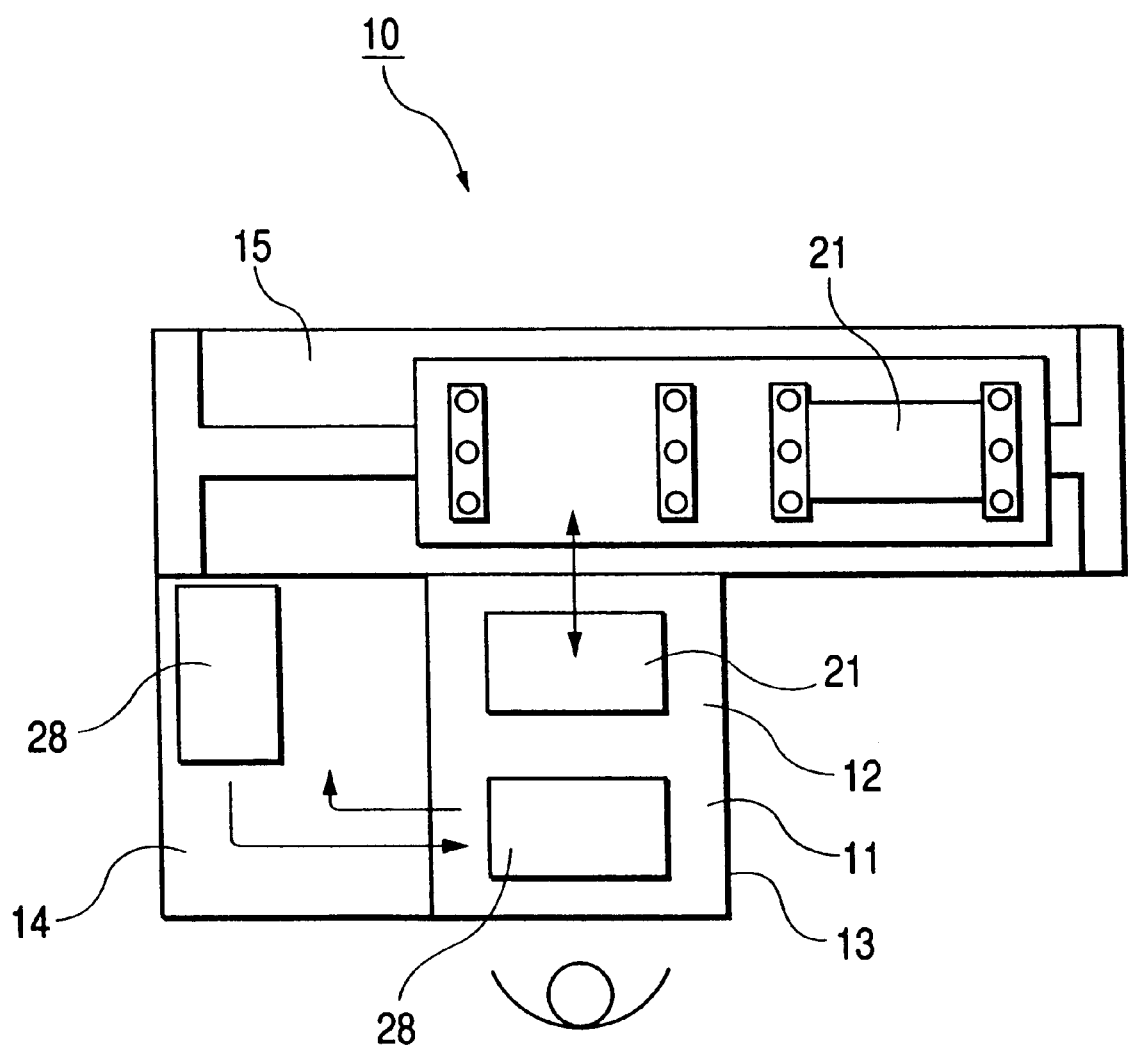
FIG. 7 is a schematic plan view, together with FIGS. 8 to 13, showing an embodiment of a welding apparatus using a heating plate.
Figure 8:
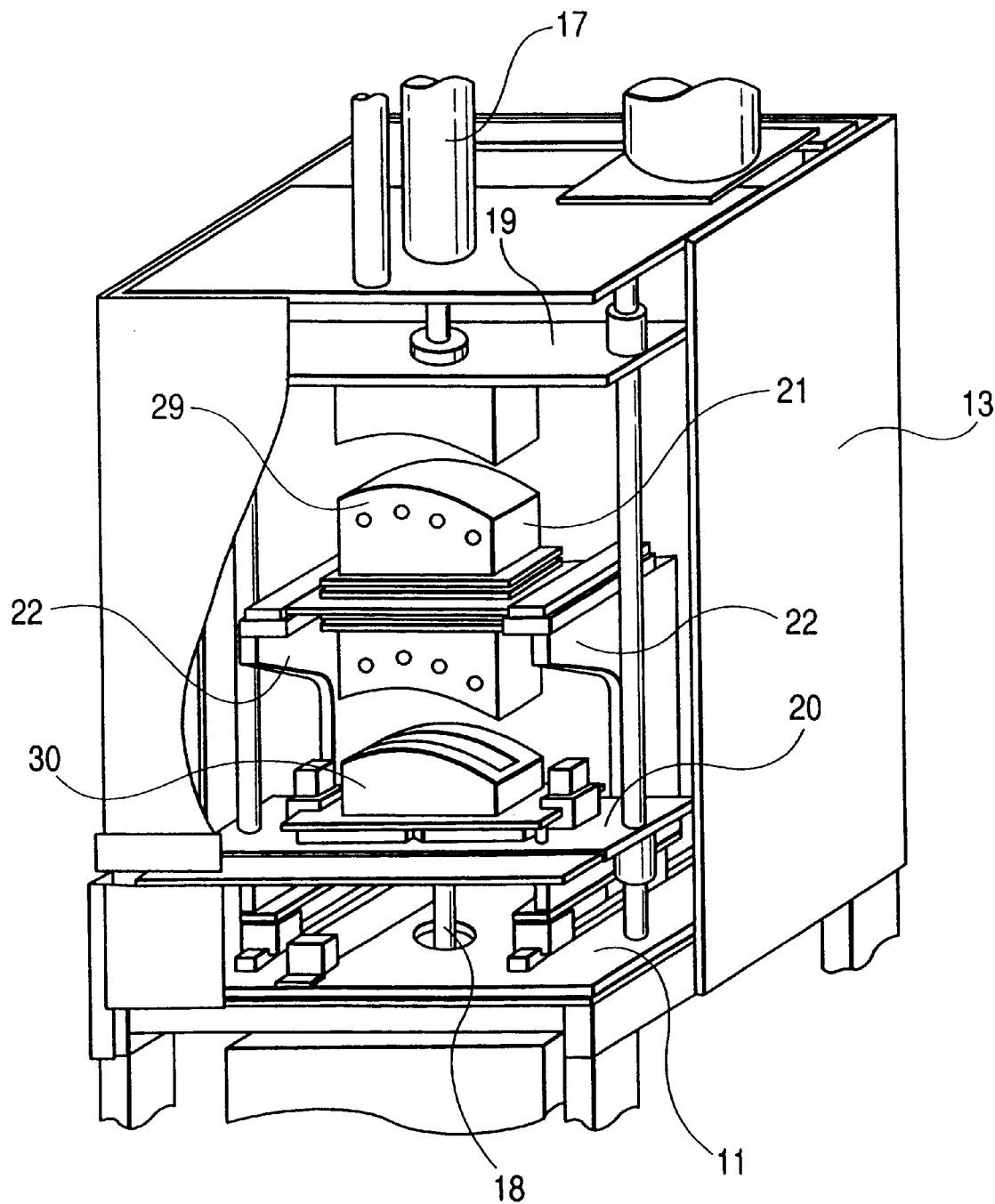
FIG. 8 is a perspective view showing the schematic structure of a main body.

FIG. 7 is a plan view showing the overall layout of a welding apparatus 10 using a heating plate.

A jig standby region 14 is formed continuously from the side portion of a body 13 which has a working region 11 and a heating-plate standby region 12 formed continuously from the back of the working region 11. A heating-plate stocker 15 is formed continuously from the back of the heating-plate standby region 12.

The upper surface of the jig standby region 14 is included in the same plane which includes the upper surface of the working region 11. The size of the upper surface of the jig standby region 14 is sufficiently large to permit two pairs of jigs to be placed on the upper surface of the jig standby region 14.

Four small recesses 16, are formed in the upper surface of the working region 11. The working region 11 is provided with an upper-jig slider 19 and a lower-jig slider 20 which are vertically moved by corresponding cylinders 17 and 18. The working region 11 is provided with heating-plate support portions 22 which support the lower surfaces of two side portions of the heating plate 21.

The heating-plate stocker 15 is provided with an elevator 23 such that two heating plates 21 can be stacked on the elevator 23. Moreover, the elevator 23 is able to move in the vertical direction. Note that the elevator 23 may be moved laterally. The elevator 23 incorporates heating-plate holding portions 24 provided with sliding means 25. Each sliding means 25 incorporates support bases 26 for supporting the lower surfaces of the side portions of the heating plate 21. A plurality of balls 27 are disposed on the upper surface of the support bases 26 such that rolling of each ball 27 is permitted.

In the heating-plate stocker 15, the heating plate 21 can previously be heated. Note that the heating plate 21 can be heated in the heating-plate standby region 12.

Then, plural pairs of upper and lower jigs formed into units are prepared. Each jig unit 28 incorporates an upper jig 29 and a lower jig 30. Connection rods 29b and 30b extending in the connecting directions are provided for the four corners of base plates 29a and 30a of the jigs 29 and 30. The leading ends of the connection rods 29b and 30b are joined to one another by, for example, engagement so that the upper and lower jigs 29 and 30 are integrated and formed into a jig unit 28. Therefore, when the jigs 29 and 30 have been removed from the sliders 19 and 20, the jigs 29 and 30 are integrated and formed into the jig unit 28. Thus, handling is facilitated during carrying and preservation. Moreover, dispersion of the pair of jigs 29 and 30 and confusion about the locations of the jigs 29 and 30 can be prevented.

Balls 30c which can be rolled, are supported at four corners of the lower surface of a base plate 30a of the lower jig 30. When the jig unit 28 is moved, the balls 30c are rolled to easily move the jig unit 28.

Then, the welding operation of the welding apparatus 1 using the heating plate will now be described. The welding operation using the heating-plate which will now be described is an operation for joining a body and a lens of a lamp for an automobile. The operation will now be described as an operation for continuously joining two types of bodies and lenses.

Initially, a pair of jigs 29A and 30A (a jig unit 28A) for joining the body and the lens of a first lamp are supported by corresponding sliders 19 and 20. Also a heating plate 21A corresponding to the jigs 29A and 30A is previously heated in the heating-plate standby region 12. A jig unit 28B for joining the body and the lens of a second lamp to each other has been placed in the jig standby region 14 (see FIG. 11).

Figure 9:
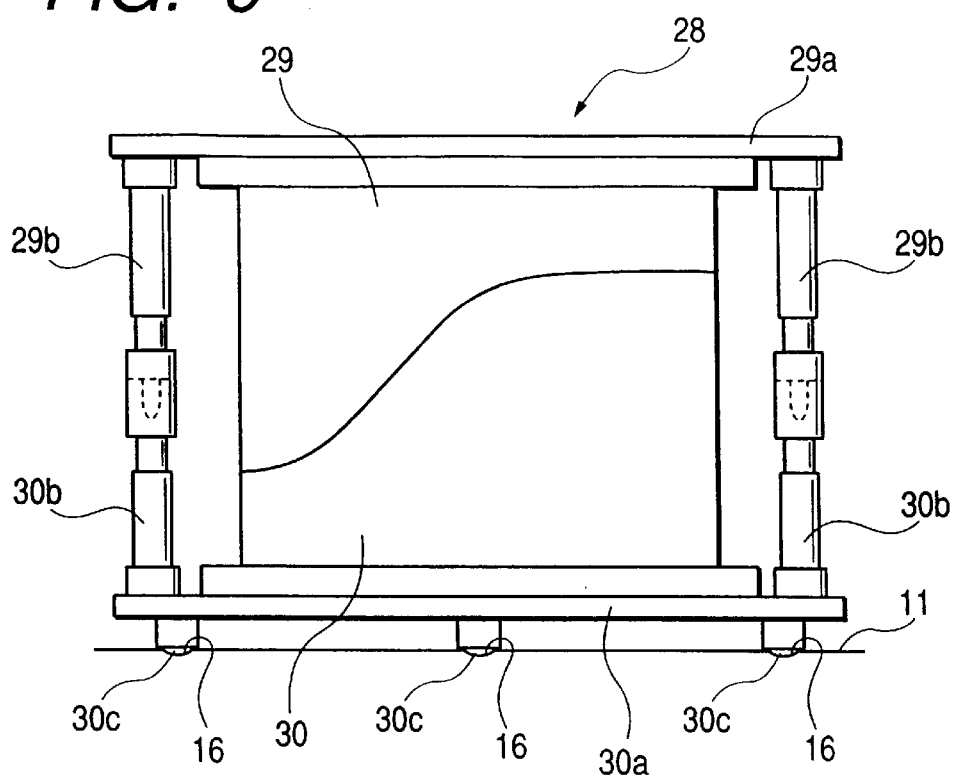
FIG. 9 is a side view showing a state in which the upper jig and the lower jig have been formed into a unit.
Figure 10:
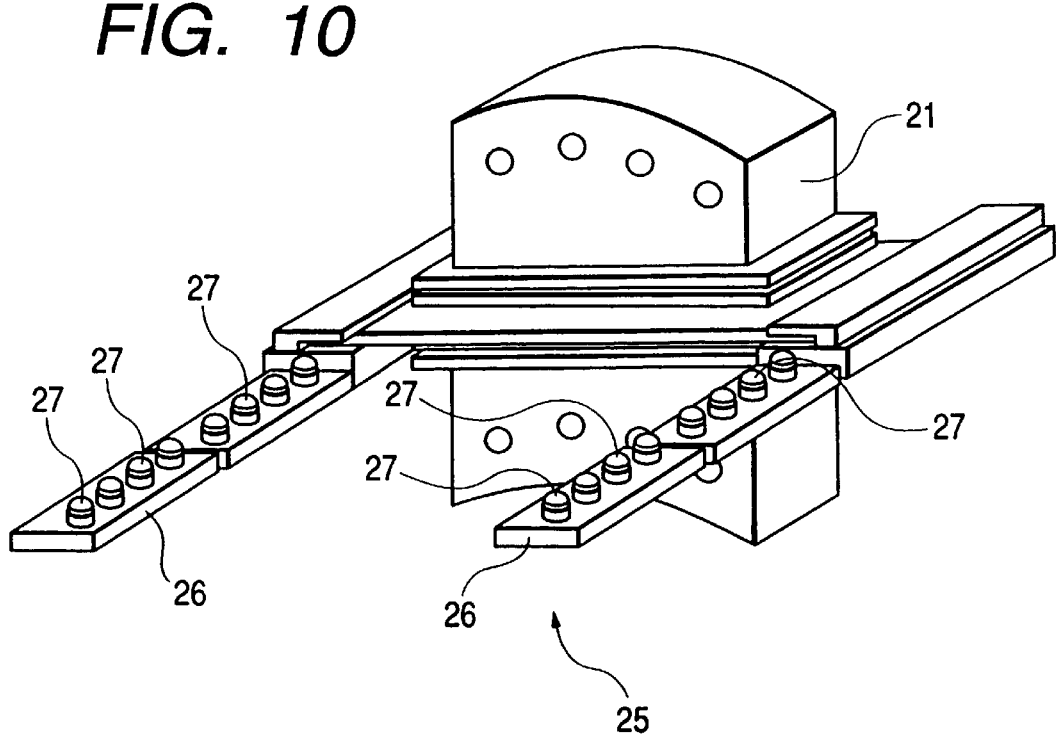
FIG. 10 is a schematic perspective view showing a means for sliding the heating plate.

When predetermined numbers of the bodies and lenses of the first lamps have been welded to each other by using the jig unit 28A, an operator 31 switches a switch (not shown)

on. Thus, the upper-jig slider 19 is moved downwards so that the upper jig 29A and the lower jig 30A are brought to a state in which the upper and lower jigs 29A and 30A are joined to each other. Moreover, the sliders 19 and 20 clamped by the jigs 29A and 30A at the lowered ends of the downward movement are released. Then, the upper-jig slider 19 is moved upwards. As a result, the upper and lower jigs 29A and 30A are formed into a unit as shown in FIG. 9 and allowed to remain in the working region 11.

Figure 12:
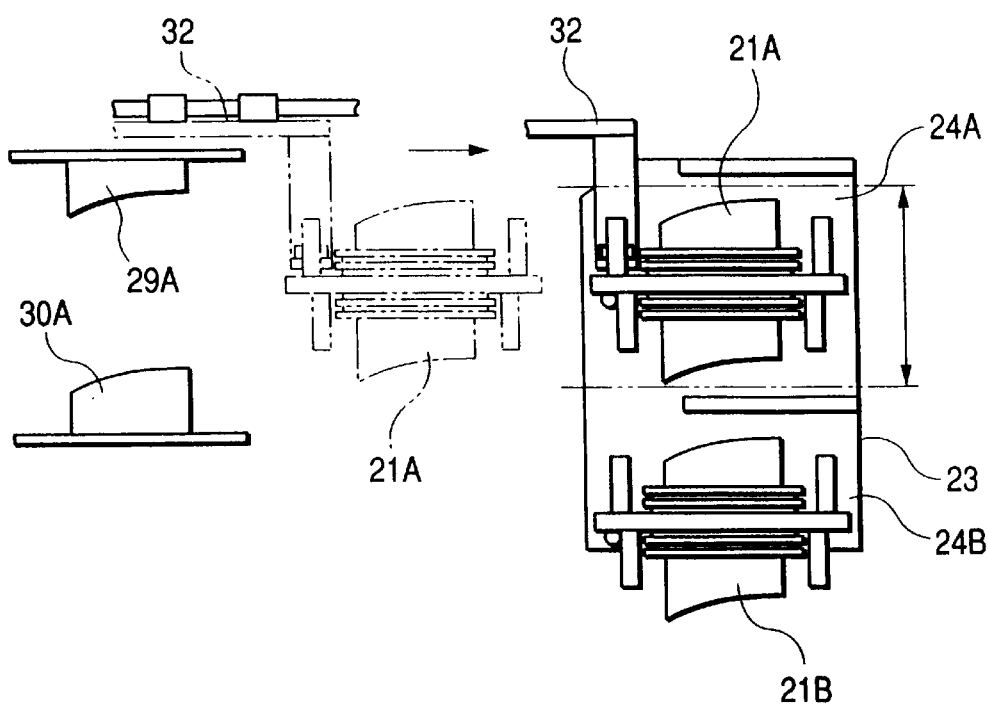
FIG. 12 is a schematic side view, together with FIG. 13, showing the procedure for changing the heating plates and a state in which a first heating plate has been returned to the heating-plate holding portion.

In the foregoing period of time, the heating-plate sliding unit 32 chucks the heating plate 21A. Moreover, the heating plate 21A clamped by the body is released. Then, the heating-plate sliding unit 32 rearwardsly moves the heating plate 21A to the heating-plate holding portion 24A. A stopper (not shown) locks the heating plate 21A at a predetermined position (see FIG. 12). Note that movement of the heating plate 21A from the heating-plate standby region 12 to the heating-plate holding portion 24A is performed such that the two side portions of the heating plate 21A roll the balls 27. Therefore, the foregoing movement can be performed very smoothly.

Then, the heating-plate sliding unit 32 is moved to the body 13 so that a heating-plate holding portion 24B is moved to a predetermined position, that is, a position corresponding to the heating-plate sliding unit 32.

Figure 13:
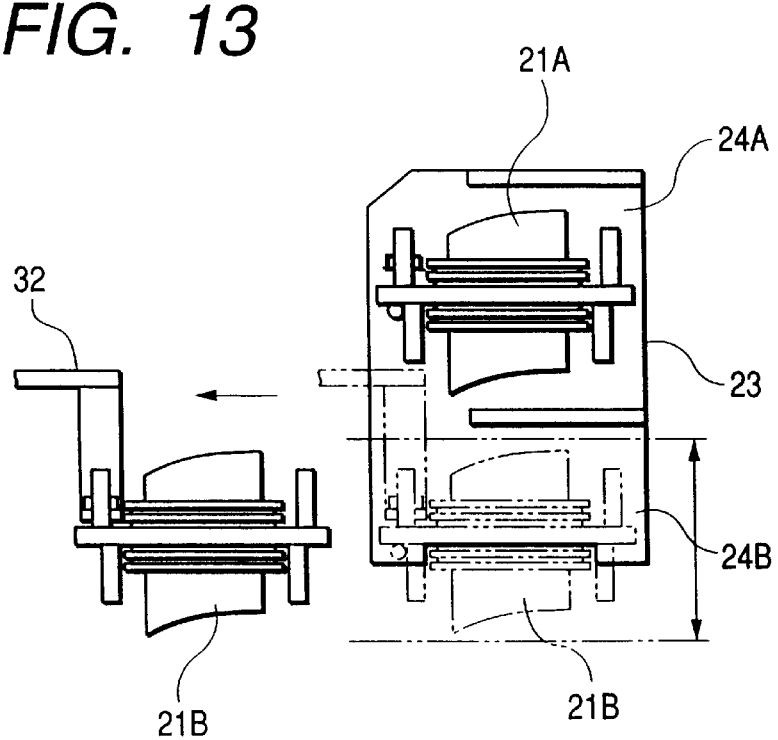
FIG. 13 is a diagram showing a state in which a second heating plate has been moved to the heating-plate standby region and a state in which the operation has been permitted.
Figure 14:
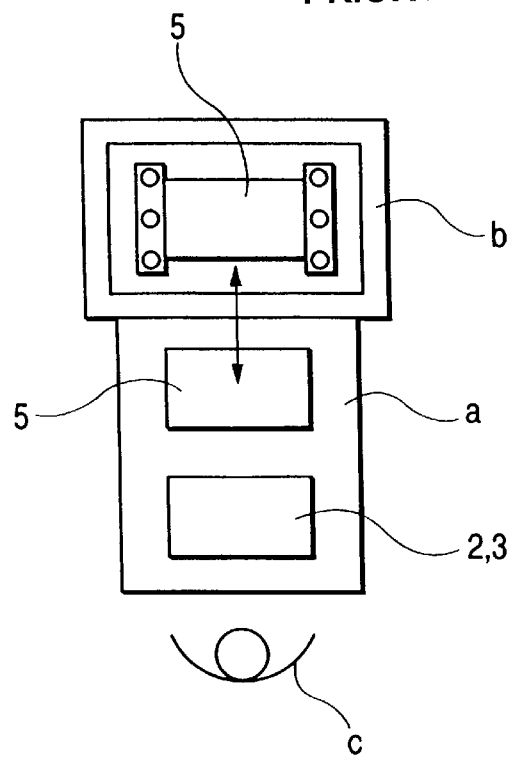
FIG. 14 is a schematic plan view showing an example of a conventional welding apparatus using a heating plate.

Then, the heating-plate sliding unit 32 extracts a heating plate 21B from the heating-plate holding portion 24B so as to be clamped in the heating-plate standby region 12 of the body 13 (see FIG. 13).

Figure 11:
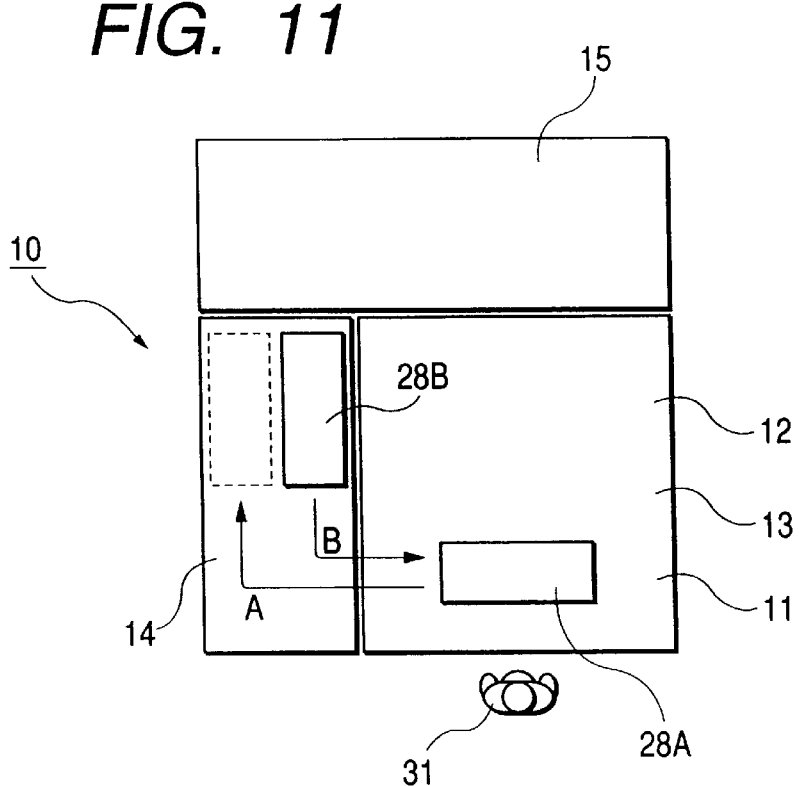
FIG. 11 is a schematic plan view showing a flow of the operation.

On the other hand, the operator 31 moves the jig unit 28A from the working region 11 to the jig standby region 14 (as indicated with an arrow A shown in FIG. 11). As an alternative to the jig unit 28A, a jig unit 28B for joining the body and the lenses of a second lamp to each other is moved from the jig standby region 14 to the working region 11 (indicated with an arrow B shown in FIG. 11). When the jig units 28 are moved, the balls 30c are moved. Therefore, the operator 31 is able to easily move the jig units 28.

In the working region 11, the balls 30c of the lower jig 30 are engaged to locating recesses 16 so that location of the jig unit 28B is determined. Then, the operator 31 switches a switch (not shown) on to downwardly move the upper-jig slider 19 so as to clamp the upper jig. Simultaneously, also the lower-jig slider 20 clamps the lower jig. Thus, the upper-jig slider 19 which is supporting the upper jig is moved upwards so that a preparation of the operation is completed.

The above-mentioned welding apparatus 1 using a heating plate permits change of the heating plates and previous heating of the heating plate. Therefore, a significantly satisfactory working efficiency can be realized and the tact time can be shortened.

Since a jig unit which is used in a next operation can previously be prepared in the adjacent standby region, the working efficiency can be furthermore improved from the foregoing viewpoint.

Since the upper and lower jigs are formed into the unit, handling is facilitated. Moreover, dispersion of the upper and lower jigs can be prevented.

The shapes and structures of the elements employed in the above-mentioned embodiment are taken as examples of the embodiment of the present invention. The technical scope of the present invention is not limited to the foregoing description.

As described above, according to the present invention, there is provided the welding method using a heating plate structured such that two synthetic-resin parts supported by upper and lower jigs and previously heated are pressed against each other so as to be welded to each other, the welding method using a heating plate comprising: the step for preparing plural pairs of upper and lower jigs and plural types of heating plates corresponding to the plural pairs of upper and lower jigs; the step for introducing the pair of upper and lower jigs into the working region; the step for putting the pair of upper and lower jigs introduced into the working region to stand by; the step for moving the heating plate corresponding to the jig and heated previously from the heating-plate stocker disposed adjacent to the heating-plate standby region to the heating-plate standby region during the period of time from introducing the upper and lower jigs into the working region and putting the synthetic-resin parts to stand by; the heating-plate welding step including the step for moving the heating plate to the working region and heating the synthetic-resin parts supported by the jigs; and the step for discharging the upper and lower jigs from the working region and discharging the heating plate from the heating-plate standby region after the step for welding the heating plates has been completed.

Therefore, the welding method using a heating plate according to the present invention has the step for moving the heating plate corresponding to the jig and heated previously from a heating-plate stocker disposed adjacent to a heating-plate standby region to the heating-plate standby region during a period of time from introducing the upper and lower jigs into the working region and putting the jigs on operation standby. Therefore, a welding step using the heating plate can immediately be started after the jigs have been put on operation standby. Therefore, the working efficiency can be improved and the tact time can be shortened.

According to the present invention, there is provided the welding apparatus using a heating plate structured such that two synthetic-resin parts supported by upper and lower jigs and previously heated are pressed against each other so as to be welded to each other, the welding apparatus using a heating plate comprising: plural pairs of upper and lower jigs and plural types of heating plates corresponding to the jigs; the working region for performing the heat-plate welding step by using the jigs and the heating plate; the heating-plate stocker for stocking and previously heating the plural types of heating plates; the heating-plate standby region which is formed between the working region and the heating-plate stocker and in which the heating plate is heated and put on standby; and the heating-plate sliding means for sliding the heating plate between the heating-plate standby region and the heating-plate stocker.

Therefore, the welding apparatus using the heating plate according to the present invention has the structure that the heating-plate stocker is disposed adjacent to the heating-plate standby region and the heating-plate is moved from the heating-plate stocker to the heating-plate standby region by the sliding means. Therefore, change of the heating plates can quickly be performed. Therefore, the working efficiency can be improved and the tact time can be shortened.

Moreover, the welding apparatus according to the present invention preferably has the structure that the upper jig and the lower jig are joined to each other in a separable state when the upper and lower jigs are not used. Therefore, handling of the upper and lower jigs is facilitated and dispersion of the upper and lower jigs can be prevented.

Furthermore, the welding apparatus according to the present invention preferably has the structure that three or more balls are disposed on the lower surface of the lower jig such that rolling of the three or more balls is permitted and the lower jig is moved by rolling the balls. Therefore, movement of the jigs is facilitated.

More preferably, the welding apparatus according to the present invention has the structure that the sliding means is constituted by disposing a plurality of balls, which can be rolled, in a direction of movement, and the heating plate is moved on the balls while the balls are being rolled. Therefore, movement of the heating plate can considerably smoothly be performed.

The present invention is based on Japanese Patent Application No. Hei. 11-991 which is incorporated herein by reference.

What is claimed is:

1. An apparatus for welding a plurality of parts, which comprises:
   a plurality of pairs of jigs for supporting a plurality of parts, at least one pair of jigs having a shape different from another pair of said jigs;
   a plurality of heating plates respectively corresponding to each pair of said jigs;
   a working region for welding the parts with said jigs and said heating plates;
   a heating-plate stocker for stocking and heating said heating plates;
   a heating-plate standby region between said working region and said heating-plate stocker and in which said heating plates are heated and put on stand by; and
   a heating-plate slider for sliding said heating plates between said heating-plate standby region and said heating-plate stocker.

2. The welding apparatus according to claim 1, wherein each pair of said jigs are separatably mated, and separated when said jigs are not used.

3. The welding apparatus according to claim 2, wherein one jig of each pair of said jigs includes more than three rotatable balls, and movement of said jigs is facilitated by rolling movement of the balls.

4. The welding apparatus according to claim 3, wherein said heating-plate slider includes rotatable balls arranged in a direction in which said heating plates are moved, and said heating plates are moved on the rotatable balls.

5. The welding apparatus according to claim 2, wherein said heating-plate slider includes rotatable balls arranged in a direction in which said heating plates are moved, and said heating plates are moved on the rotatable balls.

6. The welding apparatus according to claim 1, wherein one jig of each pair of said jigs includes more than three rotatable balls, and movement of said jigs is facilitated by rolling movement of the balls.

7. The welding apparatus according to claim 6, wherein said heating-plate slider includes rotatable balls arranged in a direction in which said heating plates are moved, and said heating plates are moved on the rotatable balls.

8. The welding apparatus according to claim 6, further comprising:
   recesses located in said working region to locate said pairs of jigs when said pairs of jigs are moved into said working region, wherein said recesses are generally half-spherical and are provided at positions corresponding to said balls.

9. The welding apparatus according to claim 1, wherein said heating-plate slider includes rotatable balls arranged in a direction in which said heating plates are moved, and said heating plates are moved on the rotatable balls.

10. The welding apparatus according to claim 1, wherein the parts are made of synthetic resin.

11. The welding apparatus according to claim 1, further comprising:
    a jig standby region to store said pairs of jigs that are not being used in said working region.

* * * * *